(12) United States Patent
Mialhe et al.

(10) Patent No.: US 9,708,050 B2
(45) Date of Patent: Jul. 18, 2017

(54) STIFFENER FOR AN AIRCRAFT FUSELAGE, METHOD FOR MANUFACTURING SAME, AND AIRCRAFT FUSELAGE EQUIPPED WITH SUCH A STIFFENER

(71) Applicant: Airbus Operations (SAS), Toulouse (FR)

(72) Inventors: Christophe Mialhe, Giroussens (FR); Romain Delahaye, Colomiers (FR); Philipe Rodrigo, Tournefeuille (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 83 days.

(21) Appl. No.: 14/652,118

(22) PCT Filed: Dec. 20, 2013

(86) PCT No.: PCT/FR2013/053232
§ 371 (c)(1),
(2) Date: Jun. 14, 2015

(87) PCT Pub. No.: WO2014/096741
PCT Pub. Date: Jun. 26, 2014

(65) Prior Publication Data
US 2015/0321742 A1    Nov. 12, 2015

(30) Foreign Application Priority Data

Dec. 21, 2012   (FR) ..................................... 12 62649

(51) Int. Cl.
*B64C 1/06* (2006.01)
*B21D 5/16* (2006.01)
(Continued)

(52) U.S. Cl.
CPC .................. *B64C 1/06* (2013.01); *B21D 5/16* (2013.01); *B21D 53/92* (2013.01); *B64C 1/061* (2013.01); *B64C 1/12* (2013.01)

(58) Field of Classification Search
CPC .. B64C 1/06; B64C 1/061; B64C 1/12; B21D 5/16
See application file for complete search history.

(56) References Cited

U.S. PATENT DOCUMENTS 1,357,073 A    10/1920   Dermot
3,698,224 A    10/1972   Saytes
(Continued)

FOREIGN PATENT DOCUMENTS

EP    0554606    8/1993
EP    2404824    1/2012
FR     531501    1/1922

OTHER PUBLICATIONS

International Search Report, May 26, 2014.
French Search Report, Aug. 9, 2013.

*Primary Examiner* — Justin Benedik
(74) *Attorney, Agent, or Firm* — Greer, Burns & Crain, Ltd.

(57) ABSTRACT

This stiffener is intended for a fuselage. It comprises a hollow section that can be trapezoidal, with a base attached to the fuselage or to the floor, high enough rising sides and a top side contributing to the rigidity and cohesion of the stiffener. A direct assembly with the fuselage is possible. The base is made of two edges provided one on the other or in front of the other. This rigid stiffener, in spite of its discontinuous section, can be manufactured by simple foldings of a planar metal sheet at the beginning.

17 Claims, 6 Drawing Sheets

(51) Int. Cl.
*B21D 53/92* (2006.01)
*B64C 1/12* (2006.01)

(56) References Cited

U.S. PATENT DOCUMENTS

| | | | | |
|---|---|---|---|---|
| 4,531,695 A * | 7/1985 | Swinfield | ................ | B64C 1/068 244/119 |
| 4,635,882 A * | 1/1987 | SenGupta | ................ | B64C 1/06 188/378 |
| 5,307,601 A * | 5/1994 | McCracken | ............... | E04C 3/07 249/18 |
| 6,632,502 B1 * | 10/2003 | Allen | .................... | B29C 70/446 428/119 |
| 7,074,474 B2 * | 7/2006 | Toi | ........................ | B29C 70/443 244/119 |
| 8,087,614 B2 * | 1/2012 | Childs | .................... | B64C 3/182 244/119 |
| 8,628,041 B2 * | 1/2014 | Mialhe | .................... | B64C 1/068 244/117 R |
| 8,746,618 B2 * | 6/2014 | Brook | .................... | B29C 70/222 244/119 |
| 2007/0095982 A1 * | 5/2007 | Kismarton | ............. | B29C 70/44 244/119 |
| 2009/0283638 A1 * | 11/2009 | Arevalo Rodriguez | ................... | B29D 99/0014 244/119 |
| 2010/0025529 A1 * | 2/2010 | Perry | .................... | B29C 65/562 244/117 R |
| 2010/0133380 A1 * | 6/2010 | Roebroeks | ............. | B32B 15/08 244/119 |
| 2010/0282905 A1 * | 11/2010 | Cazeneuve | ............... | B64C 1/06 244/120 |
| 2012/0006940 A1 * | 1/2012 | Mialhe | .................... | B64C 1/068 244/117 R |

* cited by examiner

STIFFENER FOR AN AIRCRAFT FUSELAGE, METHOD FOR MANUFACTURING SAME, AND AIRCRAFT FUSELAGE EQUIPPED WITH SUCH A STIFFENER

CROSS-REFERENCES TO RELATED APPLICATIONS

This application claims the benefit of the French patent application No. 1262649 filed on Dec. 21, 2012, the entire disclosures of which are incorporated herein by way of reference.

BACKGROUND OF THE INVENTION

The subject of the invention is that of a stiffener for an aircraft fuselage, its manufacturing method, as well as an aircraft fuselage equipped with such a stiffener.

The stiffeners mentioned here can be transverse stiffeners of aircraft fuselages, in particular circular frames encircling the fuselage (either in whole, either disrupted by the landing gear, for example), or beams extending at the floors, or even longitudinal stiffeners such as stringers or longerons, or even other ribs.

A conventional frame design, represented in FIG. 1, shows that the circular frame 1 can consist of an S-shaped profile, comprising a core 2, as well as two outer wings 3 and 4. The frame 1 is attached to the skin of the fuselage 5 via a stabilizer 6 and a clip 7. The stabilizer 6 and the clip 7 are attached to the fuselage 5 by attachment means 8 such as rivets, through stringers 9 which are longitudinal stiffeners. The frame 1 is attached thereto by analogous attachment means 8. The stabilizer 6 essentially comprises an oblique rib and extending in a longitudinal plane of the aircraft that is perpendicular to that of the core 2. The clip 7 comprises a wing bearing against the stringers 9 and another wing extending in parallel with the core 2, to which it is attached.

This conventional device has the drawback to be complicated, as clearly shown by FIG. 2, which illustrates an entire fuselage sector. The complexity of the assembly also generates difficulties to comply with the tolerances. The stabilizer 6 and the clip 7 are however useful to place the frame 1 at some distance from the skin of the fuselage 5 and thus increase the rigidity of the latter.

Another solution is provided in document EP-2 404 824-A, which consists of improved transverse stiffeners, having a simple structure easily integrated to the fuselage. This stiffener includes a quadrangular hollow closed trapezoidal section, consisting of a base to be attached to other portions of the fuselage, a top side opposite to the base, and two rising sides connecting the base to the top side. It has a great strength for increased stresses undergone when damage appears in the proximity thereof. Since the base can be directly attached to the fuselage via the stringers, the stabilizer and the clip become unnecessary. The rising sides and top side ensure that a sufficient quantity of matter of the stiffener is away from the fuselage skin, which maintains the rigidity of its structure.

SUMMARY OF THE INVENTION

With the invention, it is attempted to achieve an analogous stiffener by a simple manufacturing method, putting up with a slight variation in its section. Indeed, the methods contemplated in EP-2 404 824-A comprise molding metal materials, or pultruding and drape forming composite materials, which implies either the manufacture of molds or other shaping tools, or quite long manipulations.

Manufacture of the stiffener is provided by folding a metal sheet at dividing lines between its different sides, these lines becoming the ridges of the profile. Consequently, the stiffener of the invention comprises a base to be put on the fuselage and a portion complementary to the base which is erected above the fuselage, where the profile is continuous through the portion complementary to the base, characterized in that the base is formed by two distinct portions which are opposite edges of the section of the stiffener, said opposite edges being both to be attached to the fuselage and superimposed on at least one part of the length of the stiffener.

It is extremely easy to achieve this folding on a known machine, for example by advancing the metal sheet between rotating rollers which deform it. The deformation is not accompanied by high internal stresses, not more than the profile curvature, which is generally necessary to adapt the profile to the curvature of the portion of the fuselage on which it should be mounted. Indeed, the profile comprises a base formed by two distinct portions, which are opposite edges of the original metal sheet: its section is thus discontinuous, the opposite edges being the ends. The stiffener is then more easily deformable, which allows it to absorb less internal stresses upon manufacturing, but also to be possibly reworked without much difficulty upon assembly if, for example, it has to be slightly deformed. It should be added that this deformability is not accompanied by a high rigidity loss, since the highest stresses the profile can undergo will be in the stiffener part which is complementary to the base and is erected above the fuselage, that is in the continuous part of the section, and the two base portions will be both riveted, or held by other means, to the fuselage, which will hold the profile section during its service and will restore a rigidity comparable to that of the prior profile with a closed section, even if the edges are not directly attached to each other. The metal sheet edges, which form the base, are superimposed on each other and can then be attached to the fuselage by the same attachment means. Besides, it may be contemplated that the profile has a changeable section, if, for example, it is manufactured with non-parallel folding lines, such that the opposite edges can be superimposed only on a part of the profile length.

At least one of the rising sides is advantageously notched to gain access to within the stiffener and enabling it in particular to be conveniently attached, while lighting the stiffener without a high rigidity loss.

The stiffener according to the invention can be in particular a circular frame, without excluding other kinds of stiffeners or ribs. It can be a floor rectilinear transverse stiffener or a longitudinal stiffener.

A variable height can be easily allocated to the stiffener section from the base to the top side, to take into account different arrangement requirements, or increase the rigidity where it is the more necessary.

Another aspect of the invention is an aircraft fuselage equipped with such stiffeners.

Another interesting aspect of the invention is that the cavities of the stiffeners can be exploited, in particular by accommodating cables, pipings or ventilation pipes.

The invention also relates to the method for manufacturing such stiffeners by folding a metal sheet at dividing lines forming the sides.

BRIEF DESCRIPTION OF THE DRAWINGS

The invention will now be described in more detail in connection with the following figures, given by way of illustrating purposes.

DETAILED DESCRIPTION OF THE PREFERRED EMBODIMENTS

Figure 1:
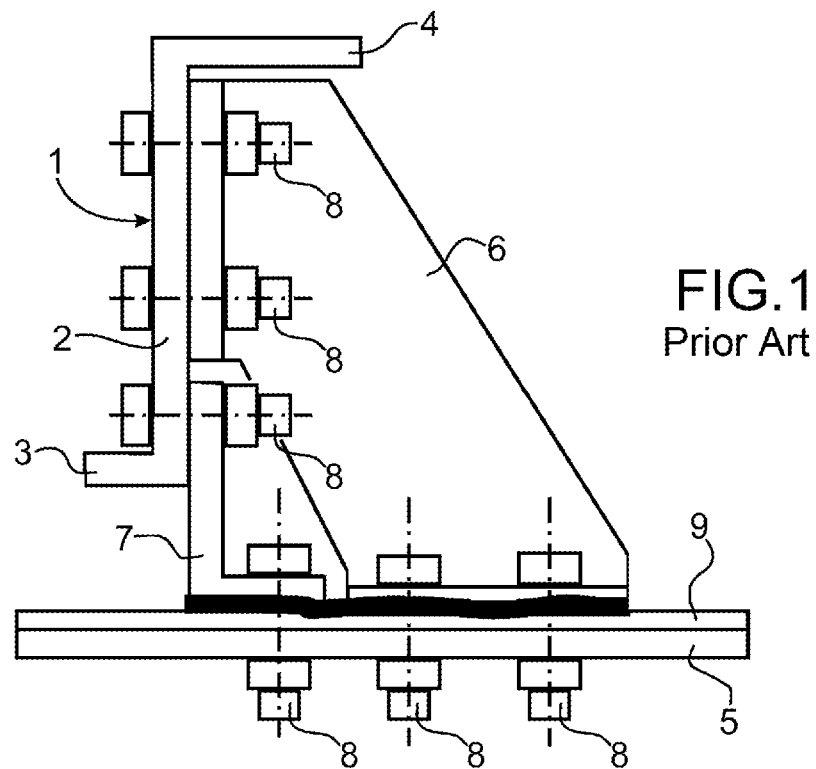
FIG. 1, already described, illustrates a known stiffener.
Figure 2:
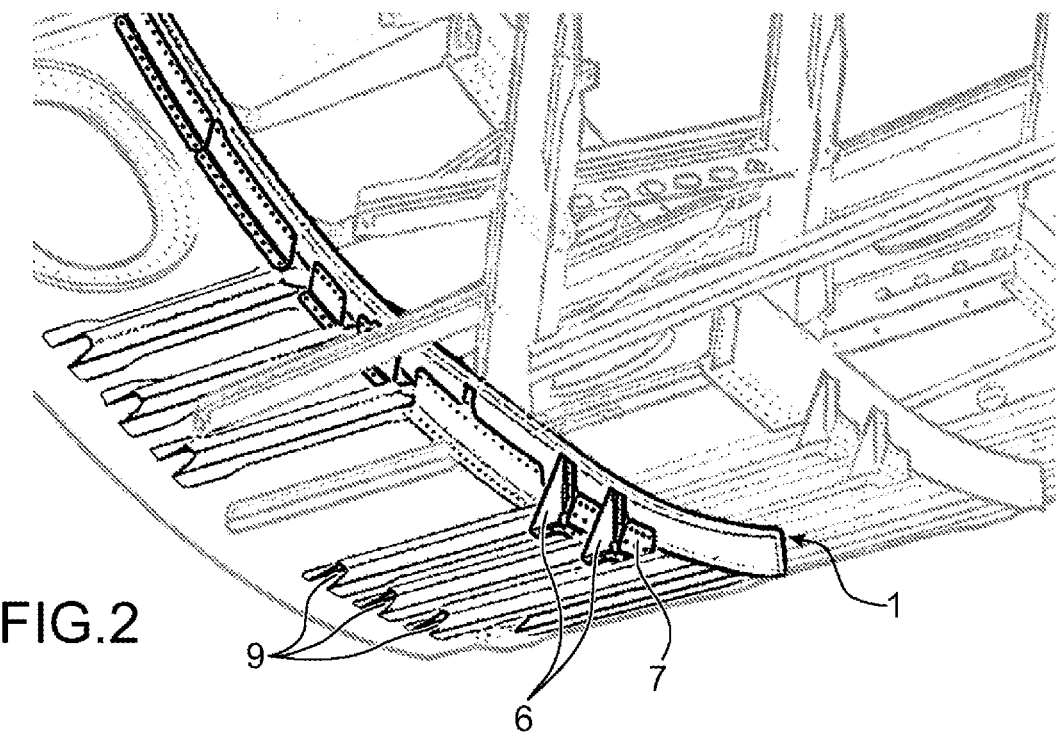
FIG. 2 illustrates the arrangement of this stiffener in a fuselage.
Figure 3:
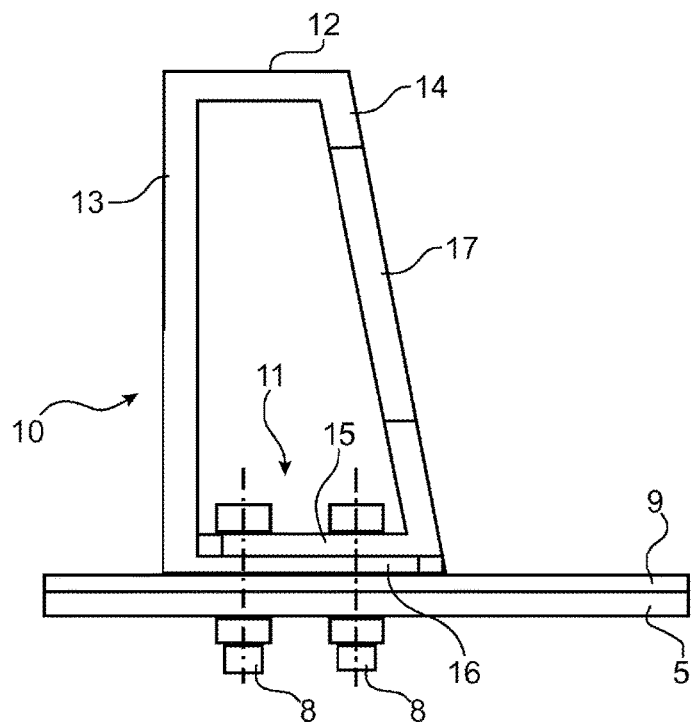
FIG. 3 illustrates a stiffener according to the invention.

FIG. 3 is now described. The stiffener 10 in accordance with the invention has a hollow section, having a great rigidity, and comprising a base 11, to be put and attached to the fuselage 5, and a portion complementary to the base 11 and which is erected above the fuselage 5. In the embodiment represented, the section of the stiffener 10 is quadrangular and trapezoidal (other shapes would be possible), and said portion complementary to the base 11 comprises a top side 12 that can be parallel to the base 11—without this being necessary—and two rising sides 13 and 14 joining the edges of the base 11 to those of the top side 12 respectively. The base 11 is comprised of two opposite edges 15 and 16 of the profile making up the stiffener 10. Even though the section of the stiffener 10 is hollow, it can be so manufactured from a simple metal sheet, which is folded so as to form the different sides of the trapezoidal section. The edges 15 and 16 are not directly attached to each other, but the attachment means 8 assemble both of them to the fuselage 5 and possibly to the stringers 9. The edges 15 and 16 are superimposed, and the same attachment means 8 attach them at the same time. The height of the rising sides 13 and 14, as well as the continuity of the section through the portion complementary to the base 11, provide the rigidity necessary to the assembled structure and enable to dispense with the intermediate attachment parts which are the stabilizers 6 and clips 7 visible in FIG. 1, and to assemble the stiffener 10 directly to the fuselage 3. Apertures called ports 17 possibly pass through one of the rising sides 14 and allow to access to the inner cavity of the stiffener 10, among other things to facilitate the assembly and clamping of the attachment means 8 or accommodate cables in the stiffener 10.

Figure 9:
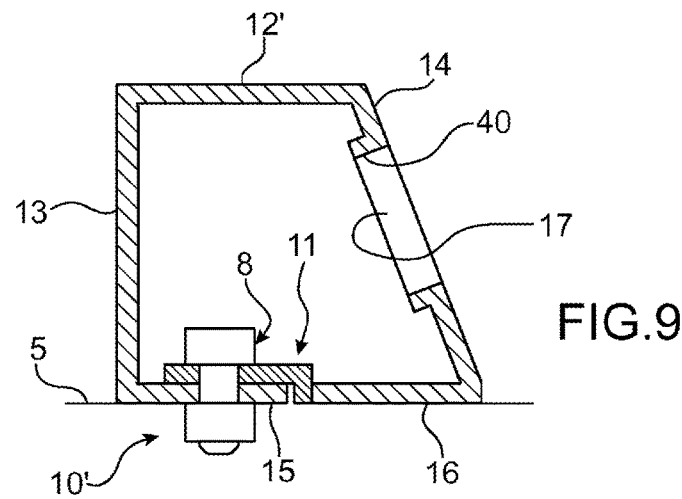
FIG. 9 illustrates an alternative embodiment of the stiffener.

The hollow section ensures the rigidity of the stiffener 10, in particular with regard to buckling, and its stability. The base 11 will be generally wider than the top side 12, and the rising sides 13 and 14 will be then at a non-null angle; one of the rising sides 13 will be able to be perpendicular to the base 11 and to the top side 12, and the other (14) be oblique. The ports 17 also enable the stiffener 10 to be lighted without much decreasing its rigidity. Here, they are provided through the rising side 14, which is oblique. The edges of the ports 17 can be stiffened via a flanged edge, which is formed by the same material as the profile after a final stamping, or by an insert. FIG. 9 illustrates such a flanged edge 40 surrounding one of the ports 17, as can be made by stamping the rising side 14. The stiffener 10' of this FIG. 9 is besides analogous to the previous one and has similar properties to those of the previous one. Other shapes of the section could also be contemplated, comprising other proportions or other numbers or other kinds of sides, as long as the section of the stiffener 10 or 10' remains hollow and continuous, except between the opposite edges 15 and 16, which both belong to the base 11 or 11' and have to be attached to the fuselage 5.

The manufacturing method can comprise folding a strip of planar metal sheet at the beginning. A flat extruded shape can also be used in the case of a metal material as has been mentioned, the ports 17 being machined or stamped afterwards.

The accidental deformations upon manufacturing, by baking or machining for example, and the relief of internal stresses will not be too significant, which will improve the cohesion of the structure assembled, will facilitate the assembly and decrease the waste. Likewise, the assembly will be facilitated by the direct bounding of the stiffeners 10 to the fuselage 5, which will allow to fulfill more easily tolerances.

Figure 4:
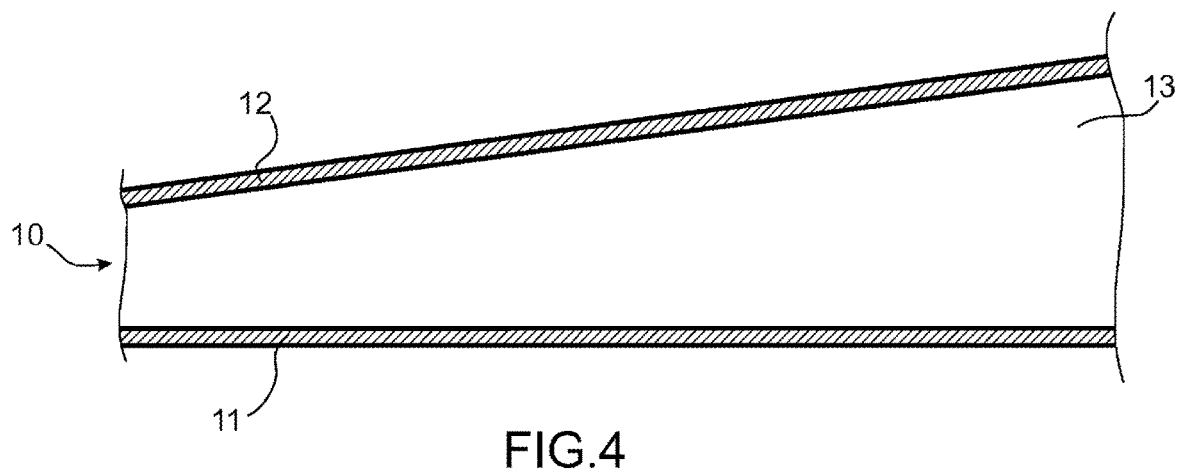
FIG. 4 represents an alternative embodiment.

FIG. 4 illustrates that the stiffener 10 can have a variable section, and in particular that its height between the base 11 and the top side 12 can be increasing, which is easy to make with oblique folding lines. Such an arrangement can be searched for to give a higher strength to the stiffener 10 at some places, or on the contrary a reduced overall space at other places. Other dimensions of the stiffener 10 can also be made variable by choosing to fold the original metal sheet about folding lines which are not parallel to each other, or to start with a metal sheet having a variable width. The width of the top side 12 or that of the base 11 can thus be made. The edges 15 and 16 can then be superimposed only on part of the length of the stiffener 10.

The assembly of the stiffeners 10 to their environment can be made in the following way, in the case where the stiffeners 10 form stiffening circular frames or sectors of such frames.

Figure 5A:
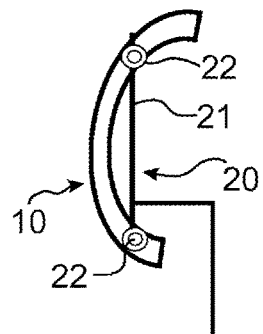
FIGS. 5a and 5b; 6a and 6b; and 7a and 7b, illustrate three steps of assembling stiffeners to the fuselage.
Figure 5B:
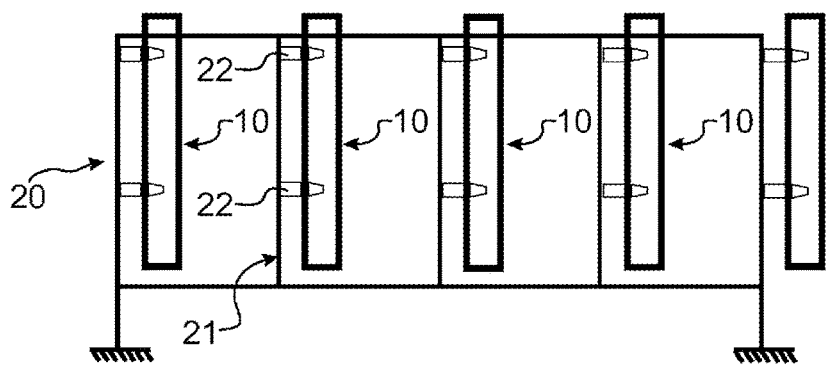

FIGS. 5a and 5b show that the stiffeners 10 can be placed on a comb-shaped tooling 20 and comprising a support structure with a stand 21 provided with centering pins 22 for each of the stiffeners 10, which are provided with centering holes intended to that end.

Figure 6A:
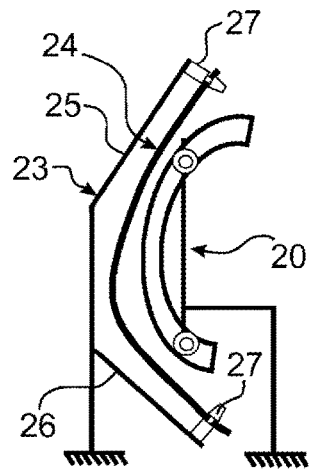
Figure 6B:
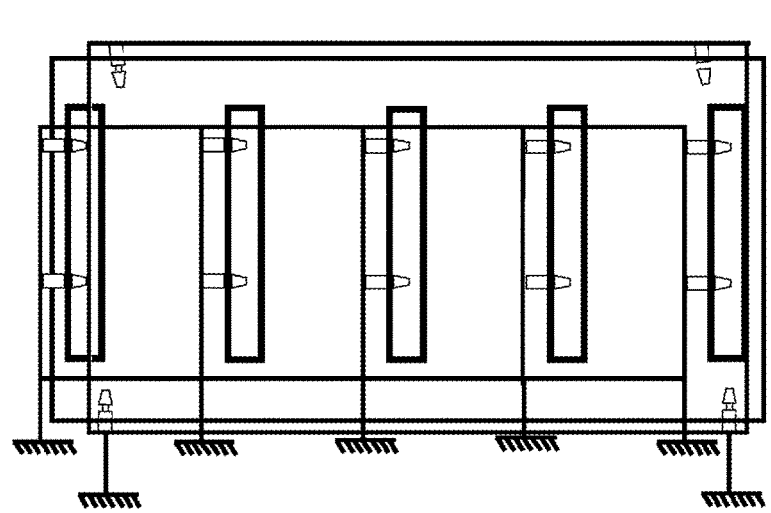
Figure 7A:
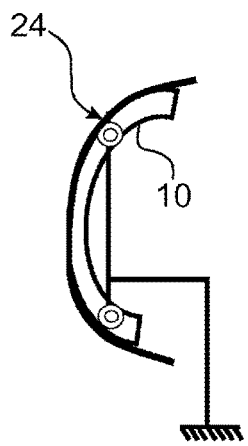
Figure 7B:
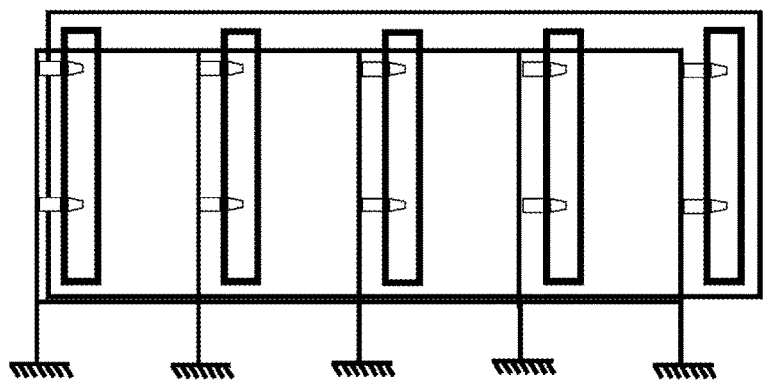

Another tooling 23, represented in FIGS. 6a and 6b, and carrying a fuselage sector 24, comprising a skin sector and the corresponding stringers, is moved closer to the tooling 20. This tooling 23 comprises an upper branch 25 and a lower branch 26 which are oblique, forming a concavity in which the fuselage sector 24 extends, which is retained at the ends of the branches 25 and 26 by other pins 27, without tensioning. The fuselage sector 24 can then be pressed against the perimeter of the stiffeners 10, be attached thereto by riveting, bounding or the like, and then the tooling 23 is removed (FIGS. 7a and 7b). The fuselage sectors 24 carrying the stiffeners 10 are then jointed and assembled to each other, the stiffeners 10 then forming stiffening circular frames.

Figure 8:
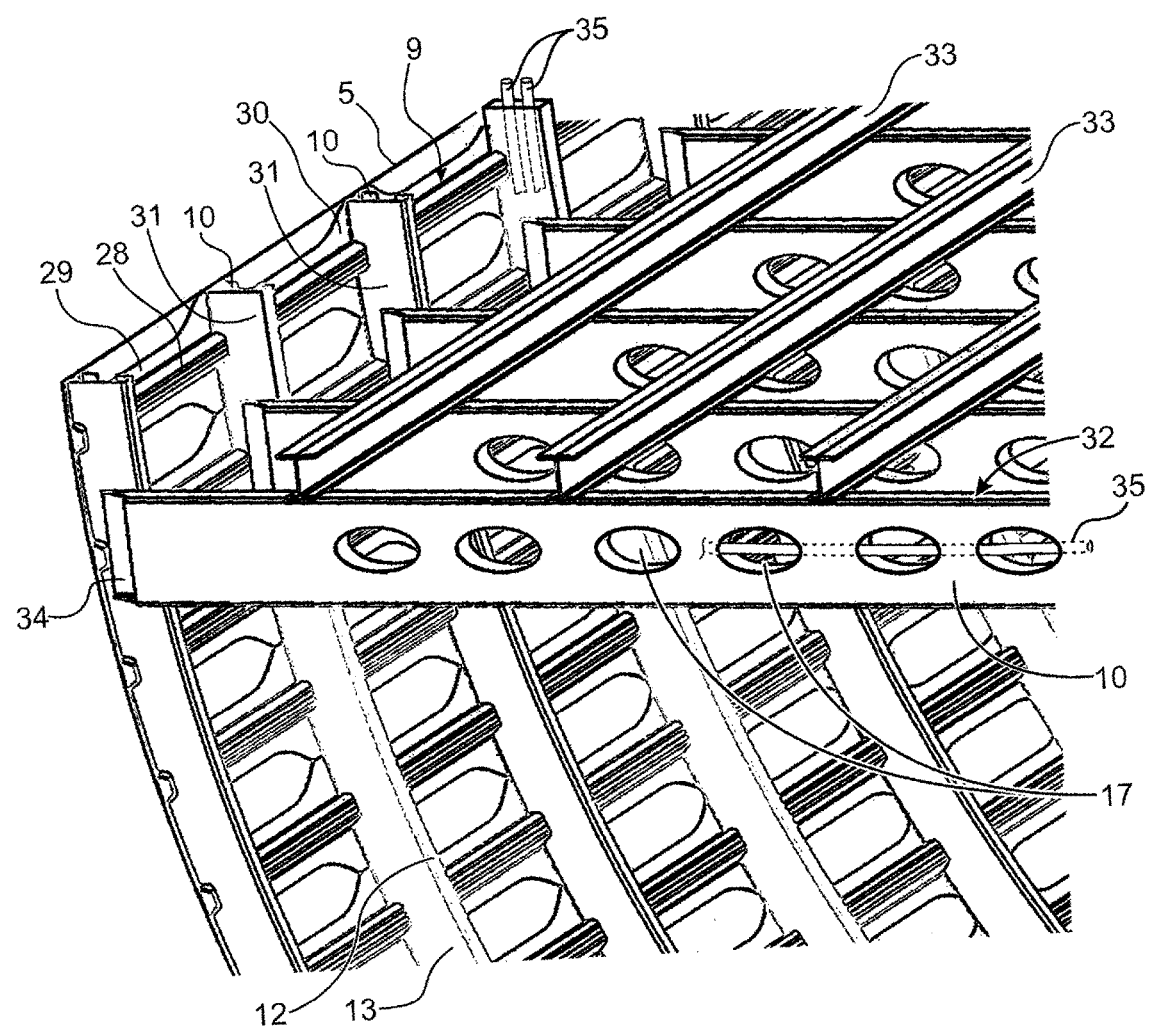
FIG. 8, illustrates the arrangement of the stiffener in accordance with the invention in the fuselage.

A possible arrangement of the fuselage is represented in FIG. 8. Therefore, the stiffeners 10 form circular frames mainly riveted to the stringers 9 and provided with notches at the places where they intersect their ribs 28. The shoes 29 of the stringers 9, in contact with the skin 5 and to which the frames are riveted, possibly comprise widened parts 30 at the place of the stiffeners 10, which extend to the widened parts 30 of the neighboring stringers 9, in order to enable the stiffeners 10 to press against the shoes 29 throughout their perimeter.

The sectors of the stiffeners 10 are assembled to each other by intermediate battens, which are joined bars which join them by riveting and which are known in the state of the art. The dimensions of the stiffeners 10 can vary between each sector depending on the needs in strength or the arrangement requirements for example.

The principles of the invention can be used to build not only the circular frames 31, but also door frames or even beams 32 (FIG. 8) which extend under the cockpit floor (not represented), above rails 33, including seat rails. The beams 32 are assembled, and in particular riveted to the rails 33. They are also formed by the stiffeners 10 being described. Their quadrangular and more generally hollow section enable them to fairly resist to torsion. The beams 32 can advantageously be united by their ends to the rising sides 13 of the frames 31. These ends 34 can be outlined or cut out so as to clear the face bearing against the frames 31 and which will be riveted thereto. The frames 31 can, if need be, have a larger width at the place of this connection for facilitating it.

The frames 31 and beams 32 can accommodate cables or pipings or ventilation ducts 35 in their hollow section, which are introduced through the ports 17.

The principle of a closed profile made by folding and resisting to high damages can also be used in wings, wing boxes, horizontal or vertical tails, stringers, fuselage stiffeners, etc.

Figure 11:
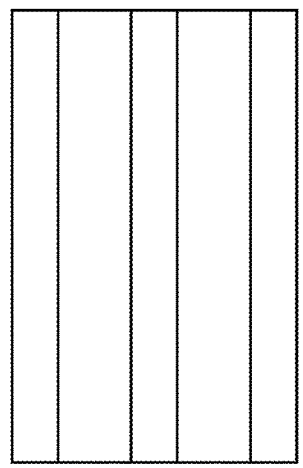
FIG. 11 illustrates the starting metal sheet of the stiffener.
Figure 11:
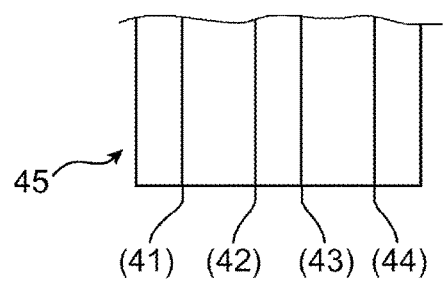
Figure 12:
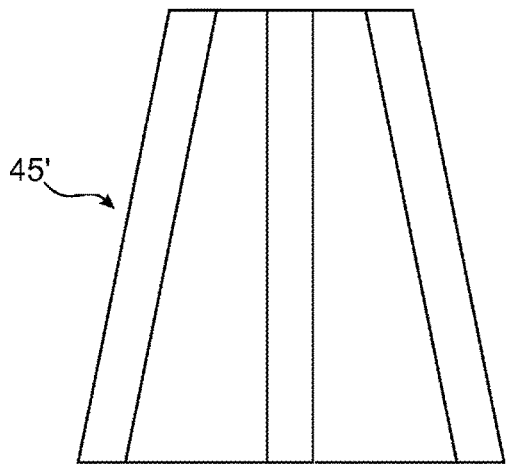
FIG. 12 illustrates another metal sheet.
Figure 12:
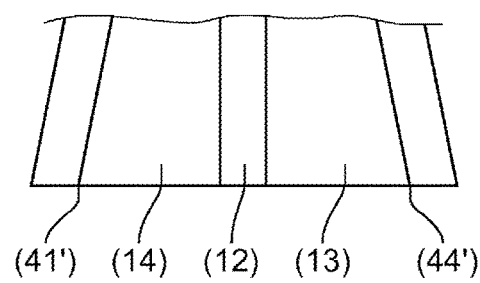
Figure 10:
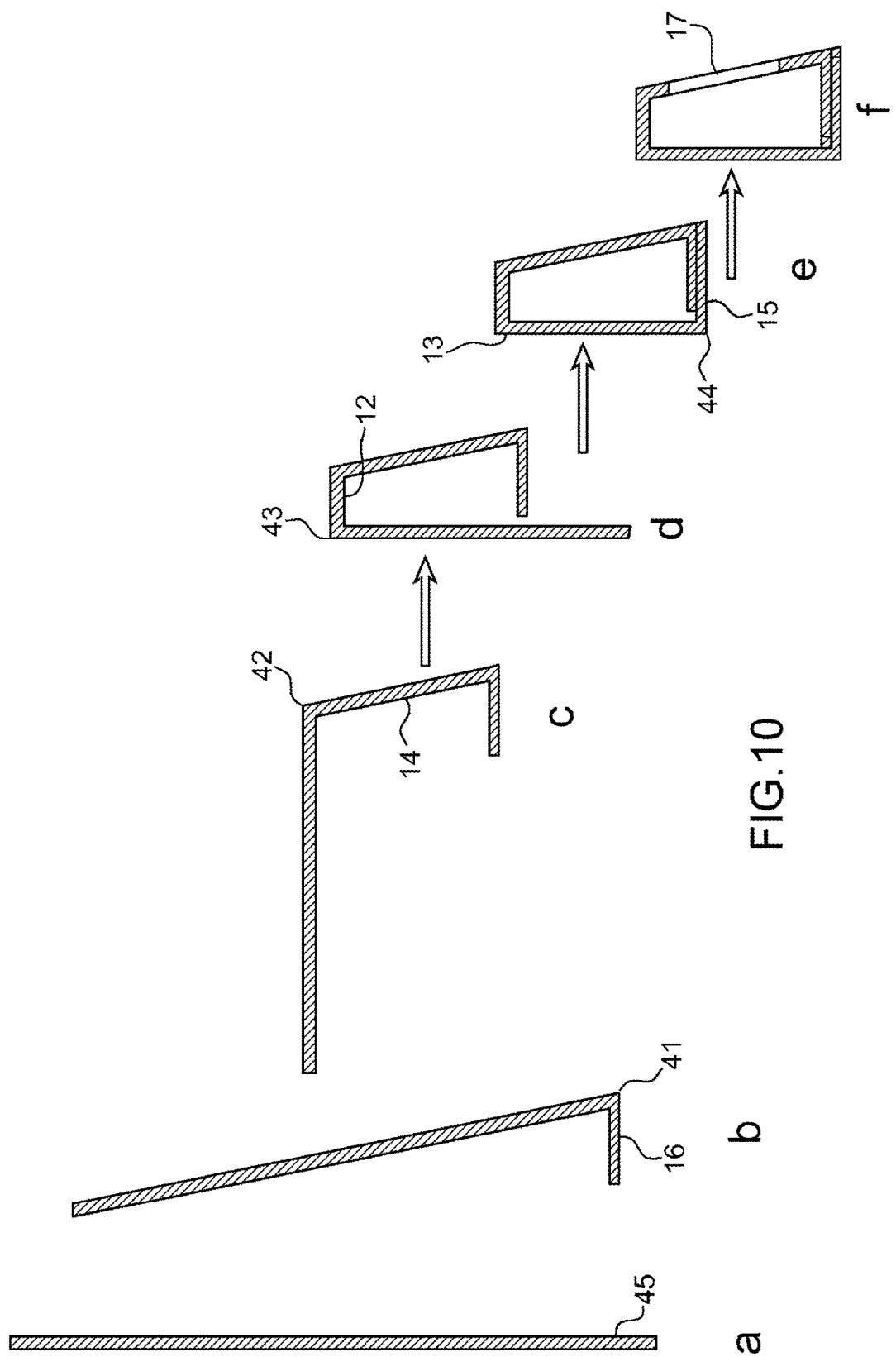
FIG. 10 illustrates the time course of a folding method.

FIG. 10 (10a, b, c, d, e, f) illustrates successive steps for manufacturing the stiffener 10 by successively folding four lines 41, 42, 43, and 44 of a flat metal sheet 45 at the beginning, to form the sides 12, 13, 14 and the edges 15 and 16 one after the other. The ports 17 are here formed at the final step, through machining. The metal sheet 45 is represented in FIG. 11, with the trace of the folding lines 41 to 44. If they are parallel, the section of the stiffener 10 will be uniform; but this is not necessary, and FIG. 12 illustrates another metal sheet 45' suitable for the embodiment of FIG. 4, where side folding lines 41' and 44' are divergent as well as the side edges of the metal sheet 45', which will actually yield the rising sides 13 and 14 with an increasing height.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A stiffener for an aircraft fuselage, comprising:
a hollow profile formed from a sheet material having a base supporting a body portion extending therefrom,
the base configured to engage a fuselage skin and the body portion configured to extend radially inwardly relative to the fuselage skin,
the profile comprising a continuous structure through the body portion to the base,
the base comprising two distinct portions which are overlapping opposite edges of the sheet material, said base configured to attach to the fuselage skin.

2. The stiffener according to claim 1, wherein the body portion comprises a top side opposite to the base, and two rising sides connecting the base to the top side, the hollow section being quadrangular.

3. The stiffener according to claim 1, wherein the top side is narrower than the base.

4. The stiffener according to claim 2, wherein one of the rising sides is provided with apertures.

5. The stiffener according to claim 4, wherein the apertures are provided with stiffened edges.

6. The stiffener according to claim 1, comprising a circular frame.

7. The stiffener according to claim 1, comprising one of a longitudinal stiffener and a floor beam.

8. The stiffener according to claim 1, comprising a variable height between the base and the top side.

9. A method for manufacturing a stiffener of an aircraft fuselage, the stiffener, comprising:
a hollow profile formed from a sheet material having a base supporting a body portion extending therefrom,
the base configured to engage a fuselage skin and the body portion configured to extend radially inwardly relative to the fuselage skin,
the profile comprising a continuous structure through the body portion to the base,
the base comprising two distinct portions which are overlapping opposite edges of the sheet material, said base configured to attach to the fuselage skin,
the method comprising the steps:
folding a metal sheet at dividing lines between the base, the rising sides and the top side.

10. The method according to claim 9, wherein the dividing lines are parallel to each other.

11. The method according to claim 9, wherein some of the dividing lines are non-parallel to each other.

12. An aircraft fuselage, characterized in that it includes a plurality of stiffeners, each stiffener comprising:
a hollow profile formed from a sheet material having a base supporting a body portion extending therefrom,
the base configured to engage a fuselage skin and the body portion configured to extend radially inwardly relative to the fuselage skin,
the profile comprising a continuous structure through the body portion to the base,
the base comprising two distinct portions which are overlapping opposite edges of the sheet material, said base configured to attach to the fuselage skin.

13. The aircraft fuselage according to claim 12, wherein cables or pipings extend in some of said stiffeners.

14. The aircraft fuselage according to claim 12, wherein the stiffener is mounted to other stiffeners by crossing them, and said other stiffeners are widened up to touch each other under the stiffener.

15. The stiffener according to claim 1, wherein the sheet material is a metal sheet material.

16. The method according to claim 9, wherein the sheet material is a metal sheet material.

17. The aircraft fuselage according to claim 12, wherein the sheet material is a metal sheet material.

* * * * *